US005887666A

United States Patent [19]

Chen et al.

[11] Patent Number: 5,887,666

[45] Date of Patent: Mar. 30, 1999

[54] IMPACT WRENCH STRUCTURE

[76] Inventors: Kenneth Chen; Chi Yu Lo, both of 3F, No. 100, Sec. 2, Tai-Lin Rd., Tai-Shan Hsiang, Taipei, Taiwan

[21] Appl. No.: 905,357

[22] Filed: Aug. 4, 1997

[51] Int. Cl.[6] .......... B23Q 5/00

[52] U.S. Cl. .......... 173/93.5; 173/93

[58] Field of Search .......... 173/93, 93.5, 176, 173/178

[56] References Cited

U.S. PATENT DOCUMENTS

| | | | |
|---|---|---|---|
| 3,605,914 | 9/1971 | Kramer | 173/93 |
| 4,947,939 | 8/1990 | Hung | 173/93 |
| 5,379,851 | 1/1995 | Huang | 173/93 |
| 5,412,546 | 5/1995 | Huang | 173/176 |
| 5,435,398 | 7/1995 | Juan | 173/93.5 |
| 5,740,892 | 4/1998 | Huang | 173/93 |

*Primary Examiner*—Scott A. Smith

*Attorney, Agent, or Firm*—David and Raymond; Raymond Y. Chan

[57] ABSTRACT

Disclosed herein is an improved impact wrench structure, particularly an impact wrench for tightening and loosening fasteners for vehicle tires, it has a reversible motor as a power source to drive a drive wheel at a high speed so that flyweight sides of two hammers provided inside the drive wheel bound outwards by a centrifugal force.

The knocking sides of the two hammers drop downwards, impacting and engaging with reception blocks of the transmission shaft and transmit output power to the transmission shaft. Such actions are repeated to perform the expected function of the novel impact wrench for tightening or loosening fastening components. The structure of the novel impact wrench of the present invention is more simple in construction, more practical in application, convenient in production and much saving cost compared to a conventional one.

1 Claim, 5 Drawing Sheets

IMPACT WRENCH STRUCTURE

BACKGROUND OF THE INVENTION

1. Field of the Invention

The present invention relates to an improved impact wrench structure, and more particularly to a novel internal structure for an impact wrench having two counterpositioned hammers fixed to a drive wheel and an auxiliary wheel. A spring is engaged to the flyweight side of the brake hammer for restricting the action of the brake hammer. When rotation of the drive wheel rotated by a driving motor reaches to a certain speed, the flyweight side of the brake hammer bounds outwards due to a centrifugal force produced by rotation of the brake hammer itself At this moment the knocking side of the brake hammer drops downward, impacting a reception block of the transmission shaft and engages with it and transmits power to the transmission shaft. The design of the two hammers and incorporated with spring of the present invention contributes to make the impact wrench more practical in application and convenient in assembling and production compared to a conventional one.

2. Description of the Prior Art

The impact wrench available in the market are quite similar in their shapes and functions, but each has its own feature so far as the internal structure is concerned. One of the cases is an utility model under the R.O.C. patent "Spare Tire Installation and Removal Tool" (application Ser. No. 75,207,418), published in R.O.C. Patent Gazette dated Jan. 1, 1987. The internal structure of this utility model is very complicated, it has dozens of components, some of which are intricate in shape, thus causing much inconvenience to the assembling and production.

Another prior art is the utility model "Multipurpose Screw Tightening and Loosening Tool (application Ser. No. 7,821,007) published by the R.O.C. patent Gazette on Mar. 1, 1990. As an improvement of the above-mentioned utility model its structure remains substantially unchanged, the only difference lies on the clutch. The former has a trigger together with a Y-shaped weight board to separate a movable pin from a driving brake element which consequently engaging with a driven brake for transmitting power, while the latter, on the other hand, has a "rapid throwing plate" incorporated with a brake hammer so that when a rotating body reaches a certain rotating speed, "the rapid throwing plate" is expanded outwards by a centrifugal force to separate the movable pin from the brake hammer for transmitting power by engaging the brake hammer with the protruding tooth at the periphery of the brake element. The former is operating mechanically, while the latter makes use of a centrifugal force. Both of them have their own features, but at the same time a weak point in common: they consist of numerous parts and components so that their assembly is time and labor consuming resulting in a high production cost. Moreover, the shapes of some of the components are so complicated that they are difficult to assemble and produce, leading to the obvious shortcoming in terms of the costs and the time spent on assembling.

Furthermore, the impact wrench of the prior art is driven by a motor directly, which requires a higher torque and thus a motor of higher power rating is required, which in turn adds an extra weight to the impact wrench, causing increase of production cost and inconvenience to users as well.

SUMMARY OF THE INVENTION

The novel impact wrench structure of the present invention includes a reversible motor fixed to a positioning wall as a power source. A transmission gear installed at the front end of the motor shaft transmit the power by engagement with a driven gear installed at the external side of a drive wheel, while two hammers are provided at counter position symmetrically inside the drive wheel. A spring is installed between the hammers for restricting the ranges of action of the hammers. A circular hole is provided at the center of the driving wheel and a bearing is installed in the circular hole for fixing the driving wheel in its position. A dual direction reception block is installed on the transmission shaft for transmitting the power. One end of the transmission shaft is inserted to a bearing provided in the circular hole at the center of the driving wheel, while the other end of the transmission shaft is penetrating through a bearing provided at the center of an auxiliary wheel to serve as an output end incorporated with a sleeve for fastening and loosening fastening components.

There is a flyweight provided at one side of the brake hammer, the flyweight has been so estimated to cope with the restoring force of the spring. The opposing side of the flyweight is made into a knocking side. A depressed slot is provided at each side surface of the flyweight respectively. There is a circular column extending outwards from one of the depressed slots for engaging with a spring, while the other depressed slot is for restricting the movement of the brake hammer as it engages with a stop block installed at the inner surface of the drive wheel so as to prevent undesired displacement of the brake hammer caused by the spring action and hence to perform a positioning effect.

The drive wheel is rotated by the motor. When the rotation of the drive wheel reaches a certain speed, the flyweight bound outwards due to a centrifugal force. At this moment the knocking sides of the hammers drop downwards with respect to the positioning pins as their supporting points, impacting a reception block of the transmission shaft and engage with it and transmit power to the transmission shaft. Consequently, the transmission shaft and the drive wheel rotate synchronously to tighten and loosen fastening components. Every sharp impact makes the motor stop running, the centrifugal force of the hammers weakens accordingly. At this time the hammers are pulled by the elastic force of the spring, forcing the knocking sides of the hammers to leave out of the position in the reception block of the transmission shaft and back to their initial positions. As soon as the motor accelerates its rotating speed to a certain degree, the flyweight sides of the hammers bound outwards again due to a centrifugal force. At this time the knocking sides of the hammers drop downwards again, impacting the reception block of the transmission shaft and engage with it and transmit power to the transmission shaft. Such actions are repeated to perform the expected function of the novel impact wrench of the present invention for tightening or loosening fastening components. It has been made clear by above description that an object of the present invention to provide an improved impact wrench structure which is more simple in construction, more practical in application, convenient in production and much saving cost compared to a conventional one can be achieved.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
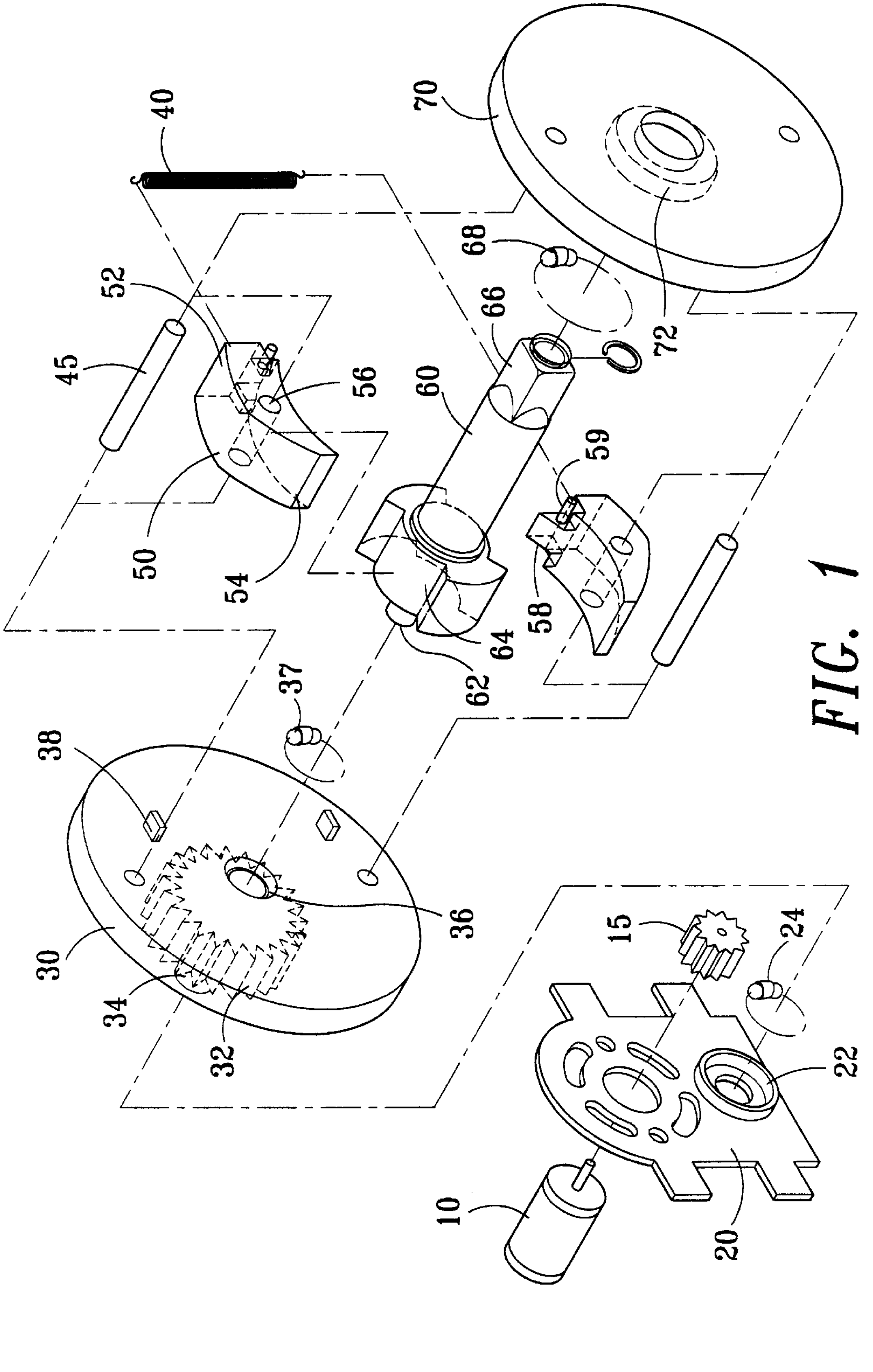
FIG. 1 is a perspective exploded view of the present invention.

Referring to FIG. 1 for a perspective exploded view of an improved impact wrench structure of the present invention. As shown in the drawing, its internal components includes a reversible motor 10, a transmission gear 15, a positioning wall 20, a drive wheel 30, two hammers 50, a spring 40, two positioning pins 45, a transmission shaft 60 and an auxiliary wheel 70.

Figure 2:
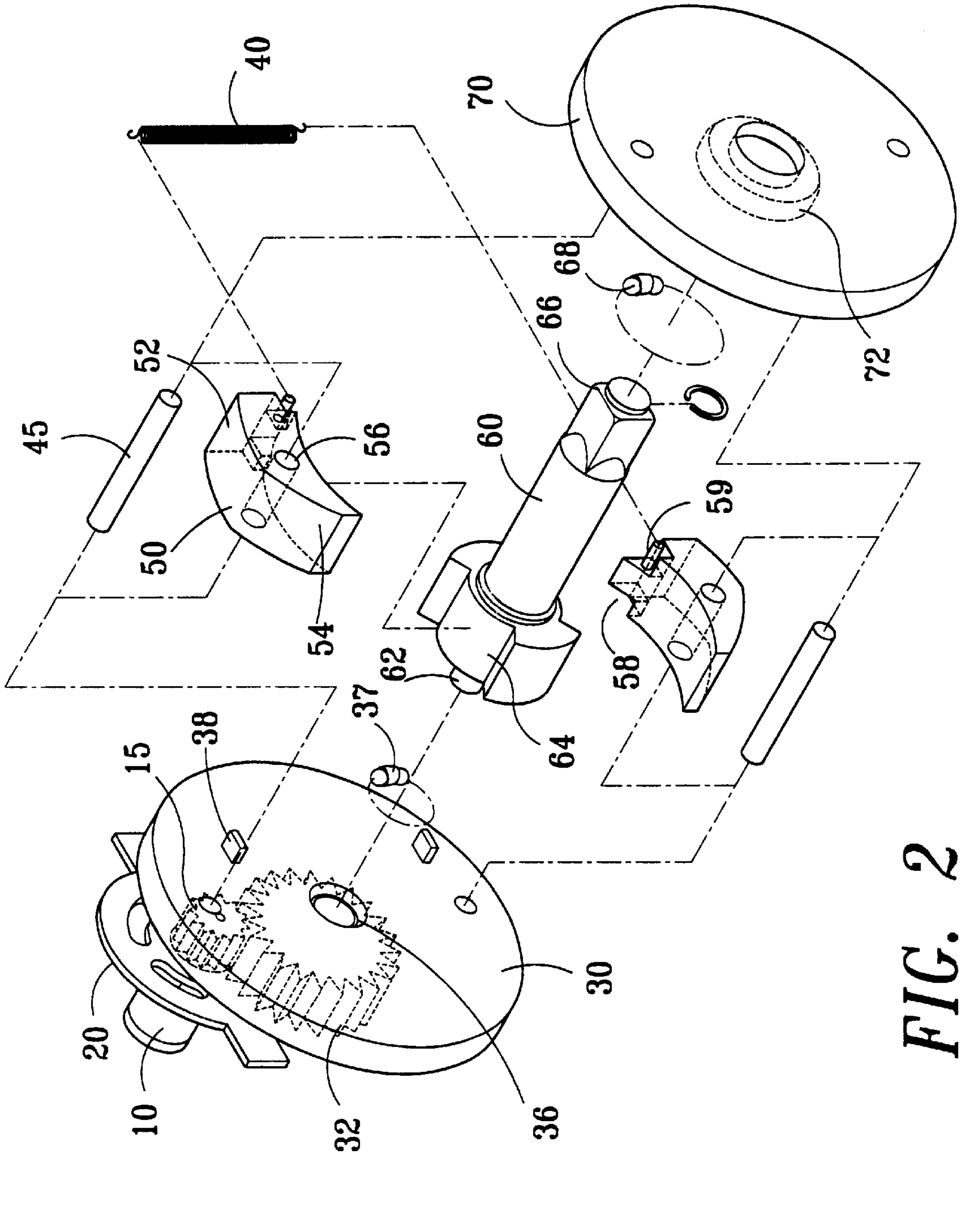
FIG. 2 illustrates the power source portion of the present invention.

Referring to FIG. 2, the reversible motor 10 is a power source which provides power by a transmission gear 15 at its front end engaging with a driven gear 32 installed at the external side of the drive wheel 30 for transmitting the power. A round shaft 34 is extended from the center of side surface of driven gear 32 of the drive wheel 30. The round shaft 34 is positioned by a bearing 24 in a circular hole 22 at lower side of the positioning wall 20.

Figure 3:
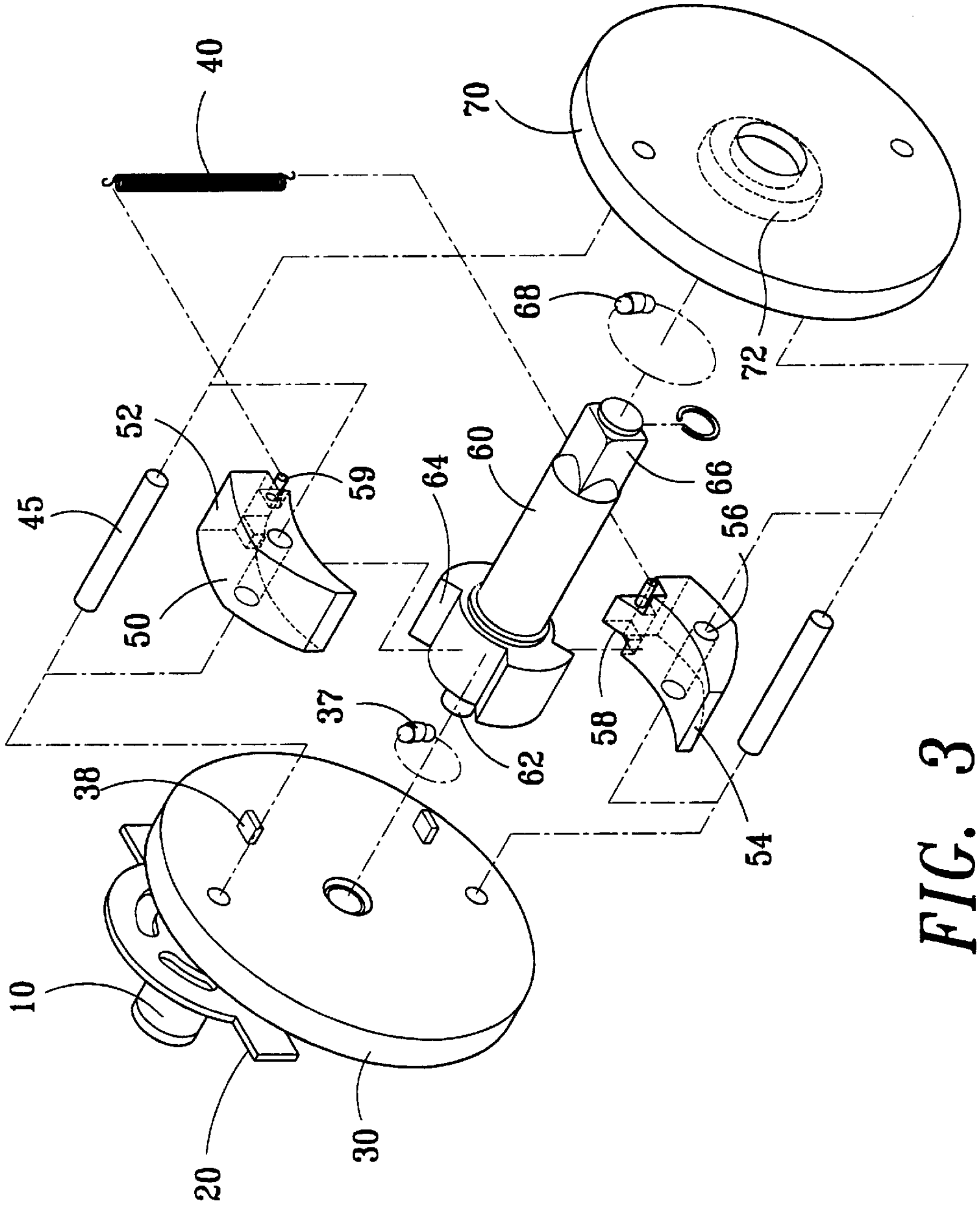
FIG. 3 illustrates the components used between the transmission wheel and the auxiliary wheel of the present invention.
Figure 4:
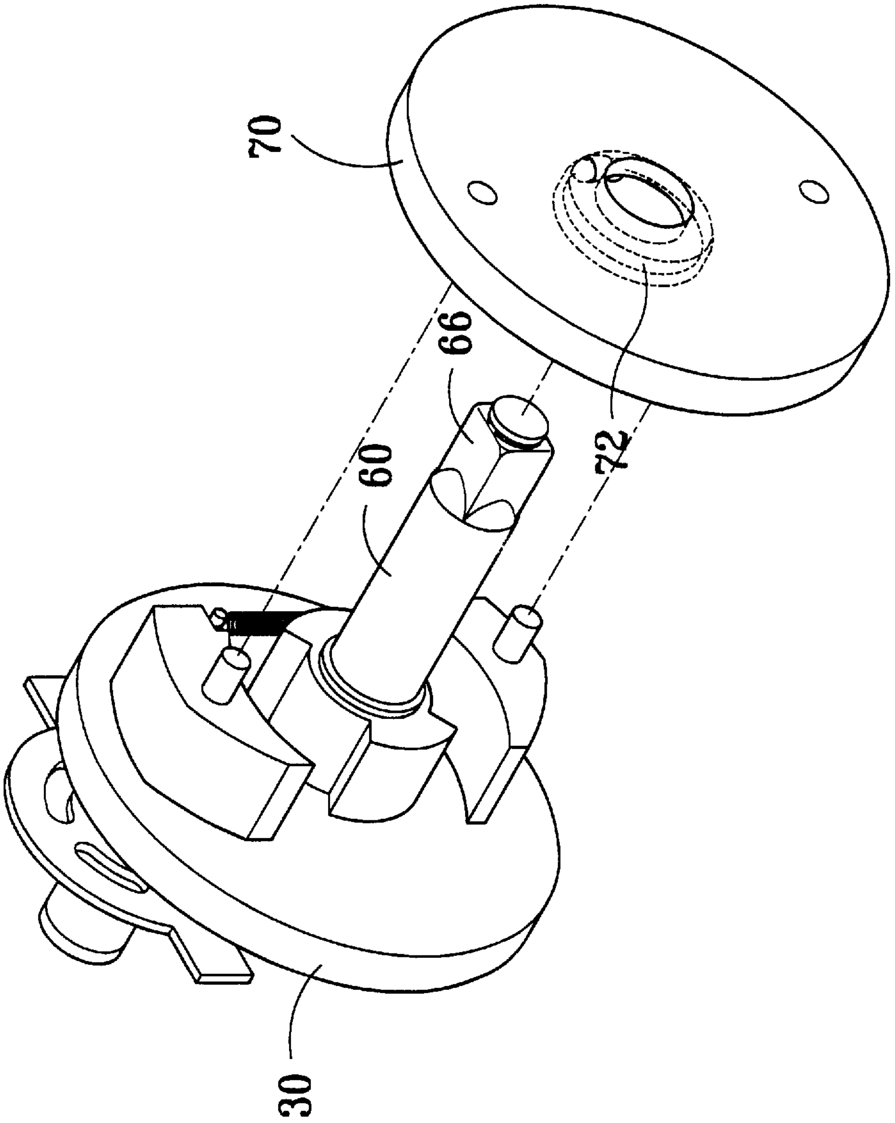
FIG. 4 illustrates assembly of the hammers and the transmission shaft of the present invention.

Referring to FIGS. 3 and 4, which are the drawings illustrating the components used between the transmission wheel 30 and the auxiliary wheel 70, and the assembly of the hammers 50 and the transmission shaft 60 of the present invention respectively. As shown in the Figs., the spring 40 is hooked at its both ends to the round columns 59 provided on both hammers 50. The elastic force of the spring 40 may pull tightly both hammers 50 with each other. The hammers 50 are positioned between the drive wheel 30 and the auxiliary wheel 70 by the positioning pins 45 passing through circular holes 56. Two stop blocks 38 are installed at the corresponding position on the inner surface of the drive wheel 30 for engaging with the depressed slots 58 of the hammers 50 to prevent an undesired displacement of the hammers caused by the excessive spring 40 action and thus to perform a positioning effect. The round axis 62 of the transmission shaft 60 is installed and positioned in the circular hole 36 of the drive wheel 30, while the other end of the transmission shaft 60 penetrating through the auxiliary wheel 70, is positioned in a circular hole 72 by means of a bearing 68.

Figure 5:
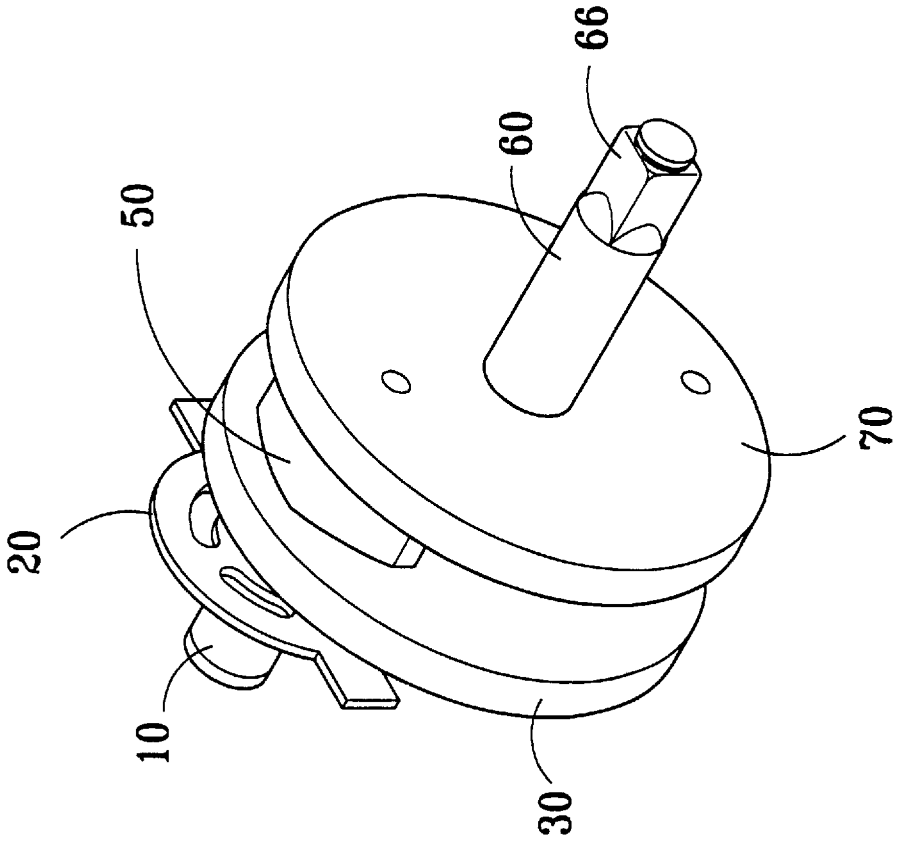
FIG. 5 is a drawing showing complete assembly of the impact wrench of the present invention.

Referring to FIG. 5 which shows a complete assembly of the impact wrench of the present invention, the novel impact wrench structure is completed by means of above described assembling and positioning of the necessary components.

As soon as the reversible motor 10 is energized, the transmission gear 15 connected to its front end starts transmitting power by its teeth engaging with those of the driven gear 32 at the drive wheel 30. When the rotation of the drive wheel 30 reaches a certain speed, the flyweight 52 of the hammers 50 installed between the drive wheel 30 and the auxiliary wheel 70 bound outwards due to a centrifugal force, as it overcomes the elastic force of the spring 40. At this moment the knocking sides 54 of the hammers 50 drop downwards with respect to the positioning pins 45 as their supporting points, impacting a reception block 64 of the transmission shaft 60 and engage with it, and transmit power to the transmission shaft 60. Consequently the transmission shaft 60 and the drive wheel 30 rotate synchronously to tighten and loosen fastening components incorporated with a sleeve by the power from the output terminal 66 of the transmission shaft 60.

If the output torque becomes smaller than the torque required for working the impact wrench, the rotation of the transmission shaft 60 slows down, the centrifugal force of the hammers 50 weakens accordingly. At this time the flyweight 52 of the hammers 50 are pulled by the elastic force of the spring 40, forcing the knocking sides 54 of the hammers 50 to leave out of the position in the reception block 64 of the transmission shaft 60 and back to their initial positions. As soon as the motor 10 and the driving wheel 30 accelerate their rotating speed to a certain degree, the flyweight sides 52 of the hammers 50 bound outwards again due to a centrifugal force. At this time the knocking sides 54 of the hammers 50 drop downwards again, impacting the reception block 64 of the transmission shaft 60 forcing the transmission shaft 60 to rotate for the electrical hammer to work. By accelerating the motor 10 in case the output torque becomes insufficient so that the flyweight 52 of the hammers 50 incorporated with the action of the spring 40 may repeat the action of bounding with high speed and return to their initial positions with decreased speed, while the knocking sides 54 of the brake hammer 50 play the action of dropping downwards, impacting and engaging with the reception block 64 of the transmission shaft 60, and then leave out at the time the centrifugal force of the hammers 50 weakens. Such actions are repeated to perform the expected function of the novel impact wrench of the present invention for tightening and loosening fastening components.

Furthermore, the stop block 38 installed on the inner surface of the drive wheel 30 is for restricting the excessive displacement of the hammers 50 due to elastic force exerted by the spring 40.

The brake hammer 50 may be made of powder metallurgy or gravity cast. As for the weight of the flyweight 52 shall be determined through precise calculation with reference to the output torque required by the impact wrench and the elasticity of the spring 40 employed. The hardness of the knocking side 54 of the brake hammer 50 shall be very high for the requirement of continuous impact.

Many changes and modifications in the above described embodiment of the invention can, of course, be carried out without departing from the scope thereof According, to promote the progress in science and the useful arts, the invention is disclosed and is intended to be limited only by the scope of the appended claims.

What is claimed is:

1. An improved impact wrench structure, comprising:

a reversible motor having a transmission gear affixed to a front shaft thereof;

a positioning wall, for installation of said reversible motor, having a circular hole at a lower side thereof for receiving a first bearing, wherein said reversible motor is attached to an upper half portion of said positioning wall;

a drive wheel, in form of a circular block, having a circular hole at a center thereof for receiving a second bearing, two stop blocks respectively provided at an inner surface thereof, and a driven gear which is installed at an external side of said drive wheel being engaged with said transmission gear of said reversible motor, wherein a round shaft is extended from a center of a side surface of said driven gear and positioned by said first bearing in said circular hole of said positioning wall;

an auxiliary wheel, in a shape of a round cap, having a circular hole at a center thereof for receiving a third bearing, a pair of hammers, each of which is in a shape of an arc aegment, each having a circular hole for accepting a positioning pin to pass through for installing said respective hammer at a predetermined location of an internal side of said drive wheel by means of said positioning pin so as to position said respective hammer between said drive wheel and said auxiliary wheel, wherein one end of each of said hammers is constructed to form a flyweight side having a predetermined weight, while another end of each of said hammers is constructed to form a knocking side, each of said hammers further having two depressed slots formed at two side surfaces of one end of said respective harmmer and a round column extended from one of said depressed slots, a spring being hooked between said two round columns of said pair of hammers, wherein a relative position between said pair of hammers is changed by a pulling force of said spring exerted on said pair of hammers, wherein said two stop blocks provided on said inner surface of said drive wheel are adapted for respectively engaging with said depressed slots of said pair of hammers to prvent an undesired displacemnet of said hammers caused by said spring so as to perform a positioning effect; and a transmission shaft having a round axis at one end for rotatably poistioned in said circular hole of said drive wheel by means of said second bearing, a square end pentrating through said circular hole of said auxiliary wheel in such a manner that an output end of said transmission shaft is located outside of said auxiliary wheel, and a reception block for receiving impact force in dual direction at a predetermined position, wherein said knocking side of each of said hammers impacts and engages with said reception block.

* * * * *